United States Patent
Mestan

(10) Patent No.: US 10,909,035 B2
(45) Date of Patent: Feb. 2, 2021

(54) PROCESSING MEMORY ACCESSES WHILE SUPPORTING A ZERO SIZE CACHE IN A CACHE HIERARCHY

(71) Applicant: Apple Inc., Cupertino, CA (US)

(72) Inventor: Brian R. Mestan, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/374,667

(22) Filed: Apr. 3, 2019

(65) Prior Publication Data

US 2020/0320004 A1  Oct. 8, 2020

(51) Int. Cl.
| | |
|---|---|
| G06F 12/00 | (2006.01) |
| G06F 12/0811 | (2016.01) |
| G06F 12/0831 | (2016.01) |
| G06F 12/0837 | (2016.01) |
| G06F 9/30 | (2018.01) |

(52) U.S. Cl.
CPC ...... *G06F 12/0811* (2013.01); *G06F 12/0831* (2013.01); *G06F 12/0837* (2013.01); *G06F 9/30043* (2013.01)

(58) Field of Classification Search
CPC ............ G06F 12/0811; G06F 12/0831; G06F 12/0837
See application file for complete search history.

(56) References Cited

U.S. PATENT DOCUMENTS

| | | | |
|---|---|---|---|
| 5,355,467 A | 10/1994 | Macwilliams et al. | |
| 5,692,152 A | 11/1997 | Cohen et al. | |
| 6,405,289 B1 * | 6/2002 | Arimilli | G06F 12/0831 |
| | | | 711/119 |
| 6,928,517 B1 | 8/2005 | Englin et al. | |
| 7,818,511 B2 | 10/2010 | Goodman et al. | |
| 7,987,322 B2 | 7/2011 | Moyer et al. | |
| 8,131,948 B2 | 3/2012 | Moyer et al. | |
| 8,688,919 B1 | 4/2014 | O'bleness et al. | |
| 9,703,711 B2 | 7/2017 | Parikh et al. | |
| 2002/0087803 A1 * | 7/2002 | Jones | G06F 12/0888 |
| | | | 711/138 |

OTHER PUBLICATIONS

Kushikkar et al., U.S. Appl. No. 16/418,811, entitled "Method and Apparatus for Ensuring Real-Time Snoop Latency", filed May 21, 2019, 34 pages.

* cited by examiner

*Primary Examiner* — Gurtej Bansal
(74) *Attorney, Agent, or Firm* — Kowert Hood Munyon Rankin and Goetzel PC; Rory D. Rankin

(57) ABSTRACT

A system and method for efficiently supporting a cache memory hierarchy potentially using a zero size cache in a level of the hierarchy. In various embodiments, logic in a lower-level cache controller or elsewhere receives a miss request from an upper-level cache controller. When the requested data is non-cacheable, the logic sends a snoop request with an address of the memory access operation to the upper-level cache controller to determine whether the requested data is in the upper-level data cache. When the snoop response indicates a miss or the requested data is cacheable, the logic retrieves the requested data from memory. When the snoop response indicates a hit, the logic retrieves the requested data from the upper-level cache. The logic completes servicing the memory access operation while preventing cache storage of the received requested data in a cache at a same level of the cache memory hierarchy as the logic.

20 Claims, 11 Drawing Sheets

PROCESSING MEMORY ACCESSES WHILE SUPPORTING A ZERO SIZE CACHE IN A CACHE HIERARCHY

BACKGROUND

Technical Field

Embodiments described herein relate to the field of computing systems and, more particularly, to efficiently supporting a cache memory hierarchy potentially using a zero size cache in a level of the hierarchy.

Description of the Related Art

Generally speaking, a variety of computing systems include multiple processors and a memory, and the processors generate access requests for instructions and application data while processing software applications. The processors include a central processing unit (CPU), data parallel processors like graphics processing units (GPUs), digital signal processors (DSPs), multimedia engines, and so forth. Computing systems often include two or three levels of cache hierarchy for the multiple processors. Later levels in the hierarchy of the system memory include access via a memory controller to system memory. Data from recently accessed memory locations are stored within the caches. When the data is requested again, the data is sent to a cache controller to retrieve the requested data from a cache rather than from system memory.

In some designs, system designers desire to use a processor in computing systems without an L2 cache. For example, depending on the application, the amount of instructions and data to store may be small enough that an L1 instruction cache and L1 data cache are adequate. Excluding the L2 cache in the computing system significantly reduces on-die area. In addition, designers generally desire to decrease power consumption and excluding an L2 cache can help accomplish this goal. However, in some cases the designers also desire to use the same processor in computing systems that include an L2 cache in order to expand its usefulness and marketability.

In view of the above, efficient methods and mechanisms for efficiently supporting a cache memory hierarchy potentially using a zero size cache in a level of the hierarchy are desired.

SUMMARY

Systems and methods for efficiently supporting a cache memory hierarchy potentially using a zero size cache in a level of the hierarchy are contemplated. In various embodiments, a computing system includes a memory and a processor. The computing system also includes a cache memory hierarchy with a level-one (L1) cache being at the highest level in the cache memory hierarchy and directly connected to the processor. A level-two (L2) cache is one level lower than the L1 cache in the cache memory hierarchy. A level-three (L3) cache, or system memory if there is no L3 cache, is one level lower than the L2 cache in the cache memory hierarchy. The processor includes an upper-level cache controller coupled to an upper-level cache. In addition, the upper-level cache controller is coupled to a lower-level cache controller. Although in the following description the upper-level cache controller is described as an L1 cache controller and the lower-level cache controller is described as an L2 cache controller, it is possible and contemplated that another combination of cache controllers in other levels of the cache memory hierarchy perform the steps described in the following description for supporting the cache memory hierarchy potentially using a zero size cache in a level of the hierarchy.

When the L1 cache controller determines a memory access operation results in a miss in the L1 cache, the L1 cache controller sends a miss request with attributes (e.g., cacheable, non-cacheable) associated with the memory access operation to the L2 cache controller. When the L2 cache controller receives the miss request from the L1 cache controller, the L2 cache controller determines from the received attributes whether the requested data is cacheable or non-cacheable. When the requested data is non-cacheable, the L2 cache controller sends a snoop request with an address of the memory access operation to the L1 cache controller to determine whether the requested data is stored in the L1 data cache.

If the snoop response received by the L2 cache controller from the L1 cache controller indicates that the L1 cache does store the requested data, then the L2 cache controller sends a request with the address of the memory access operation to the L1 cache controller to retrieve the requested data prior to invalidating the copy of the requested data in the L1 cache. However, if the snoop response received by the L2 cache controller from the L1 cache controller indicates that the L1 data cache does not store the requested data, then the L2 cache controller retrieves the requested data from lower-level memory such as an L3 cache, if any, and system memory. The L2 cache controller prevents cache storage of the received fill data at the L2 cache, which may not be present in the computing system.

If the above memory access operation resulting in an L1 cache miss is a load operation, then the L2 cache controller sends the retrieved data received from either the L1 cache or the lower-level memory to the L1 cache controller with an indication that the retrieved data is non-cacheable. Therefore, the L1 cache controller is able to send the retrieved data to other components of the processor, such a load-store unit, to service the load operation. In addition, if the retrieved data is from the L1 cache with a dirty (modified) attribute, then the L2 cache controller sends the retrieved data to the lower-level memory for storage. However, if the above memory access operation resulting in an L1 cache miss is a store operation, then the L2 cache controller merges the retrieved data received from either the L1 cache or the lower-level memory with the store data. When the L2 cache controller performs this merging, the L2 cache controller overwrites a subset or all of the retrieved data with the store data based on the size of the store data.

After performing the merging, the L2 cache controller sends a copy of the merged data to the lower-level memory, such as an L3 cache or system memory, for storage. Next, in an embodiment, the L2 cache controller sends, to the L1 cache controller, one or more of the store data, the requested data, and the merged data with an indication specifying any data of the store operation is non-cacheable. Therefore, the L1 cache controller is able to send an indication to other components of the processor, such a load-store unit, that the store operation is serviced without storing the non-cacheable merged data or the non-cacheable requested data in the L1 cache. In some designs, the L1 cache controller performs the merging of the store data and the requested data, and sends the resulting merged data to the L2 cache controller without being aware that there is no L2 cache. The L2 cache controller will later discard it. Due to the non-cacheable attribute, the L1 cache controller does not attempt to store the merged data in the L1 cache.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
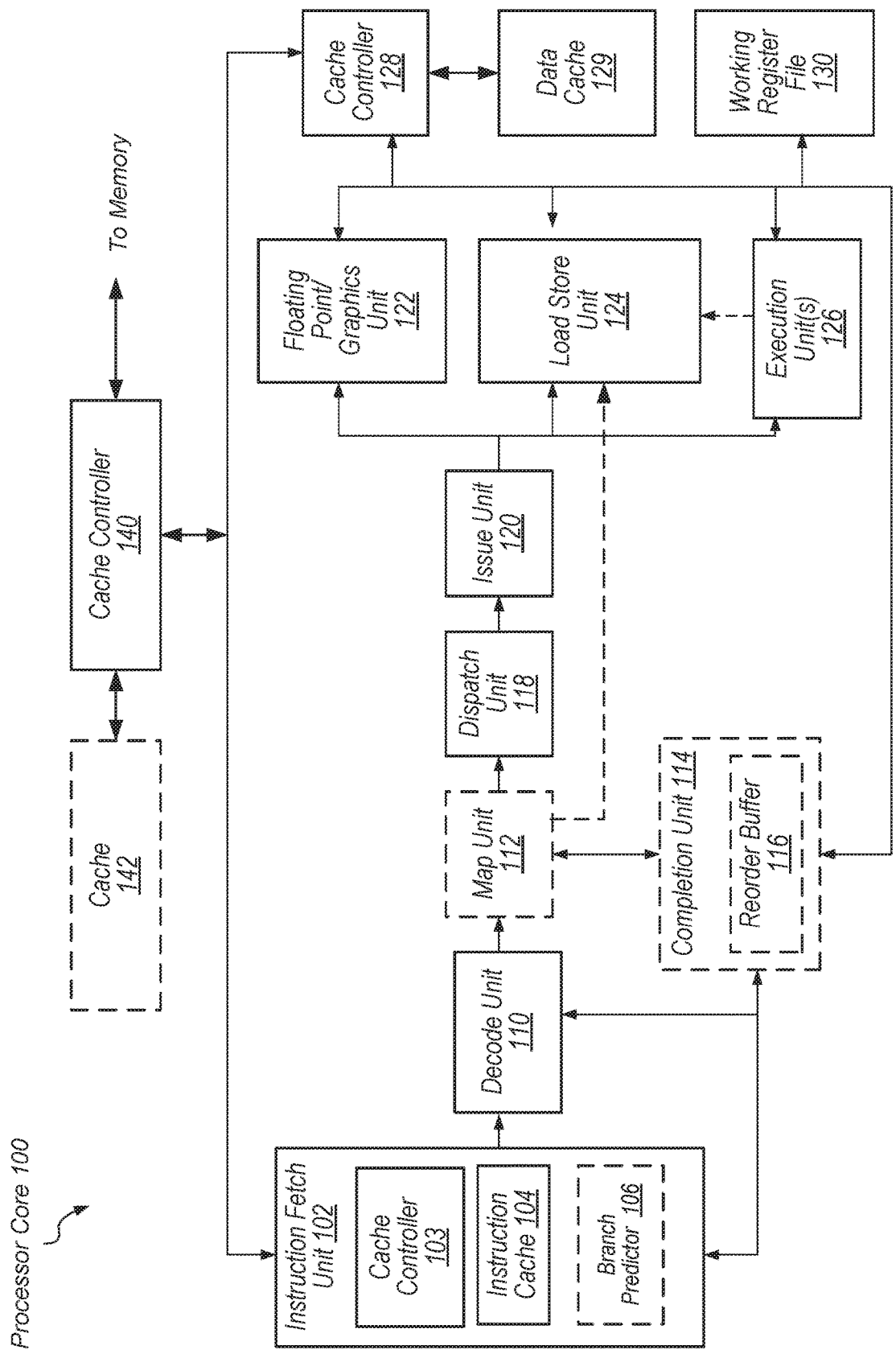
FIG. 1 is a block diagram of one embodiment of a processor core.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning now to FIG. 1, a block diagram illustrating one embodiment of a processor core 100 is shown. In various embodiments, the logic of processor core 100 is included in one or more cores of a central processing unit (CPU). Processor core 100 includes instruction fetch unit (IFU) 102. Fetched instructions are sent from the IFU 102 to decode unit 110, possibly a map unit 112, a dispatch unit 118, and issue unit 120. Issue unit 120 is coupled to issue instructions to any of a number of instruction execution resources including execution unit(s) 126, a load store unit (LSU) 124, and/or a floating-point/graphics unit (FGU) 122. The instruction execution resources 122-126 are coupled to a working register file 130. Additionally, LSU 124 is coupled to the cache controller 128, which transfers messages, memory requests, and memory responses with data cache 129. Additionally, the cache controller 128 as well as the cache controller 103 within the IFU 102 transfers messages, memory requests, and memory responses with the cache controller 140.

If the processor core 100 supports out-of-order execution, then the processor core 100 includes the reorder buffer 116. The reorder buffer 116 is coupled to IFU 102, decode unit 110, working register file 130, and the outputs of any number of instruction execution resources. It is noted that the illustrated embodiment is merely one example of how processor core 100 is implemented. In other embodiments, processor core 100 includes other components and interfaces not shown in FIG. 8. Alternative configurations and variations are possible and contemplated.

In an embodiment, each of the instruction cache 104 and the data cache 129 are level-one (L1) caches of a cache memory hierarchical subsystem. In such an embodiment, the cache 142, if present, is a level-two (L2) data cache and the cache controller 140 is a level-two (L2) cache controller. In some embodiments, the level-one (L1) caches 104 and 129 are at the highest level in the cache memory hierarchy and directly connected to the processor 100. As shown, the level-two (L2) cache 142 is one level lower from the L1 caches 104 and 129 in the cache memory hierarchy. If a level-three (L3) data cache is used, then the L3 data cache is one level lower from the L2 cache 142 in the cache memory hierarchy, and so on. Therefore, the cache controller 128 is also referred to the upper-level cache controller 128, and the cache controller 140 is also referred to as the lower-level cache controller 140. Although in the following description the L2 cache controller 128 is described as the lower-level cache controller 128 and the L1 cache controllers 103 and 128 are described as the upper-level cache controllers 103 and 128, it is possible and contemplated that another combination of cache controllers in other levels of the cache memory hierarchy perform the steps described in the following description for supporting the cache memory hierarchy potentially using a zero size cache in a level of the hierarchy.

In various embodiments, the processor core 100 includes the lower-level cache controller 140 despite not including the lower-level cache 142, which would be a L2 cache in the cache hierarchical memory subsystem. In some embodiments, a computing system uses the processor core 100 without an L2 cache, such as cache 142, since an amount of instructions and data to store is small enough for the L1 caches 104 and 129 to support. In addition, the computing system designers desire to reduce the on-die area, so removing the lower-level cache 142 provides the area savings. However, in other embodiments, the computing system uses the processor core 100 with an L2 cache, such as the cache 142. Therefore, the lower-level cache controller 140 is designed to support memory access requests whether or not the processor core 100 includes the lower-level cache 142.

Again, the IFU 102 includes the upper-level cache controller 103, which is used to access the upper-level instruction cache 104. In some designs, the IFU 102 also includes the branch predictor 106. However, in other designs, the processor core 100 supports in-order execution of instructions, rather than out-of-order execution of instructions, and thus, the processor core 100 does not include the branch predictor 106. In various designs, the IFU 102 also includes a return address stack (not shown). IFU 102 also includes a number of data structures in addition to those shown such as an instruction translation lookaside buffer (ITLB), instruction buffers, and/or other structures configured to store state that is relevant to thread selection and processing (in multi-threaded embodiments of processor 100).

In various designs, IFU 102 uses the upper-level cache controller 103 to fetch instructions from upper-level instruction cache 104 and buffer them for downstream processing. The upper-level cache controller 103 also requests data from the lower-level cache 142 or memory through the lower-level cache controller 140 in response to instruction cache misses. The instructions that are fetched by IFU 102 in a given clock cycle are referred to as a fetch group, with the fetch group including any number of instructions, depending on the embodiment. In one embodiment, decode unit 110 prepares fetched instructions for further processing such as by inspecting opcodes of the fetched instructions and determining register identifiers for source and destination operands.

Map unit 112 maps the decoded instructions (or uops) to physical registers within processor 100. When the processor core supports out-of-order execution, the map unit 112 also implements register renaming to map source register addresses from the uops to the source operand numbers identifying the renamed source registers. Dispatch unit 118 dispatches uops to reservation stations (not shown) within the various execution units. Issue unit 120 sends instruction sources and data to the various execution units for picked (i.e., scheduled or dispatched) instructions. In one embodiment, issue unit 120 reads source operands from the appropriate source, which varies depending upon the state of the pipeline.

In the illustrated embodiment, processor core 100 includes a working register file 130 that stores instruction results (e.g., integer results, floating-point results, and/or condition signature results) that have not yet been committed to architectural state, and which serve as the source for certain operands. The various execution units also maintain architectural integer, floating-point, and condition signature state from which operands may be sourced. Instructions issued from issue unit 120 proceed to one or more of the illustrated execution units to be performed. In one embodiment, each of execution unit(s) 126 is similarly or identically configured to perform certain integer-type instructions defined in the implemented ISA, such as arithmetic, logical, and shift instructions. Floating-point/graphics unit (FGU) 122 performs and provide results for certain floating-point and graphics-oriented instructions defined in the implemented ISA.

Load store unit (LSU) 124 processes data memory references, such as integer and floating-point load and store instructions and other types of memory reference instructions. In an embodiment, LSU 124 interfaces with the upper-level cache controller 128 to access requested data stored in one of the data cache 129, the lower-level cache 142 (if available) and external memory. The upper-level cache controller 128 includes logic for detecting data cache misses and to responsively request data from the lower-level cache controller 140. The lower-level cache controller 140 includes similar components and logic as upper-level cache controllers 103 and 128. However, when the processor core 100 does not include the lower-level cache 142, the lower-level cache controller 140 services memory access operation while preventing cache storage of the requested data in lower-level cache 142.

In various embodiments, the lower-level cache controller 140 receives a miss request from one or more of the upper-level cache controller 103 and the upper-level cache controller 128. In one example, when the requested data of a miss request from the data upper-level cache controller 128 is non-cacheable, the lower-level cache controller 140 sends a snoop request with an address of the memory access operation to the upper-level cache controller 128 to determine whether the requested data is in the upper-level data cache 129. When the snoop response indicates a miss, the lower-level cache controller 140 retrieves the requested data from memory. When the snoop response indicates a hit, the lower-level cache controller 140 retrieves the requested data from the data cache 129 via the upper-level cache controller 128. In an embodiment, the lower-level cache controller 140 also sends an indication to the upper-level cache controller 128 to invalidate its copy of the requested data after sending a copy to the lower-level cache controller 140. If the memory access operation is a store operation, the lower-level cache controller 140 merges the store data with the retrieved requested data. If the requested data is modified, then the lower-level cache controller 140 sends a copy of the modified data to memory.

The lower-level cache controller 140 completes servicing the memory access operation while preventing cache storage of the received requested data in the lower-level cache 142. Similarly, when the upper-level cache controller 103 sends a miss request, due to self-modifying code, the lower-level cache controller 140 sends a snoop request to the upper-level data cache 129 via the upper-level cache controller 128. Following this, to service the miss request from the upper-level cache controller 103, the lower-level cache controller 140 performs similar steps as described above for received miss requests targeting non-cacheable data. In other cases, when the lower-level cache controller 140 receives a remote snoop request from an external processor core, the cache controller sends the remote snoop request to the upper-level cache controller 128 without checking the lower-level cache 142.

When the processor core 100 supports out-of-order and speculative execution of instructions, completion unit 114 includes reorder buffer (ROB) 116 and coordinates transfer of speculative results into the architectural state of processor 100. Entries in ROB 116 are allocated in program order. Completion unit 114 includes other elements for handling completion/retirement of instructions and/or storing history including register values, etc. In some embodiments, speculative results of instructions are stored in ROB 116 before being committed to the architectural state of processor 100, and confirmed results are committed in program order. Entries in ROB 116 are marked as completed when their results are allowed to be written to the architectural state. Completion unit 114 also coordinates instruction flushing and/or replaying of instructions.

Figure 2:
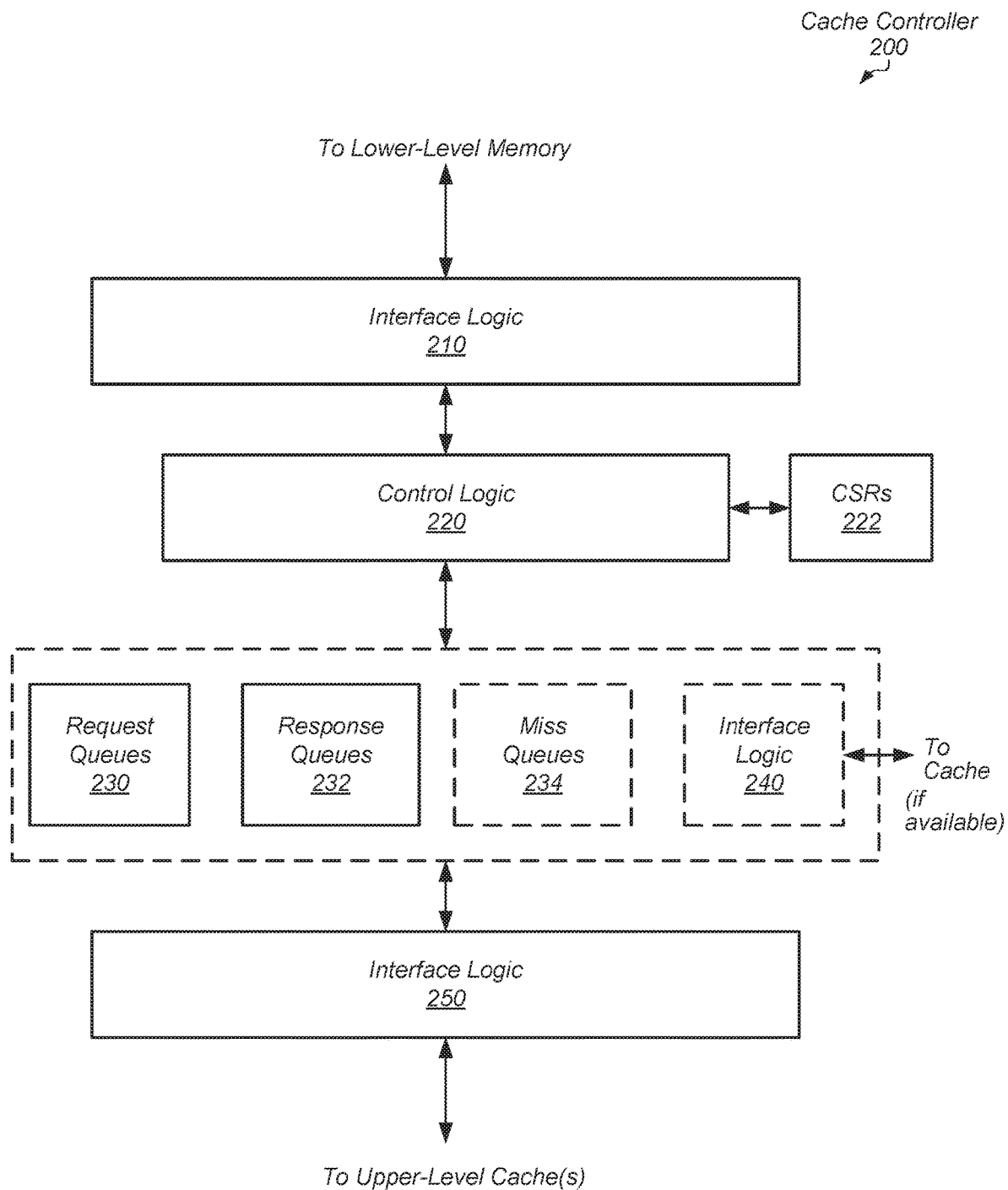
FIG. 2 is a block diagram of one embodiment of a cache controller.

Referring to FIG. 2, a generalized block diagram of one embodiment of a cache controller 200 is shown. The cache controller 200 includes interface logic 210 for communicating with off-chip memory such as system memory, and interface logic 250 for communicating with an upper-level cache. The one or more upper-level caches may be at an upper-level with respect to a cache memory hierarchy. For example, a level-one (L1) cache is at the highest level in the cache memory hierarchy, which is directly connected to the processor, and a level-two (L2) cache is one level lower from the L1 cache in the cache memory hierarchy. System memory is at the lowest level in the cache memory hierarchy. In an embodiment, the cache controller 200 is a L2 cache controller using interface logic 250 for interfacing with an upper-level L1 data cache controller and an upper-level L1 instruction cache controller. Each of the interface logic 210 and 250 includes logic for supporting appropriate communication protocols and determining when to drive data on buses and when to receive data on buses.

The cache controller 200 also includes request queues 230 for storing received memory requests from the one or more upper-level cache controllers. The response queues 232 store the read response data and write acknowledgments corresponding to memory requests stored in request queues 230 being serviced. The control logic 220 includes logic for assigning priorities to the memory requests and the memory responses, and scheduling when to deallocate them from the queues 230 and 232. In some embodiments, weights and priorities are stored in programmable registers within the configuration and status registers (CSRs 222).

Although the cache controller 200 supports accessing data stored in a cache memory at a same level as the cache controller 200 in the cache memory hierarchy, in various embodiments, no such cache is included in the computing system. This cache is considered to be a zero size cache. In one example, the cache controller 200 is an L2 cache controller and the computing system does not include an L2 cache. Therefore, the L2 cache is considered to be a no size or zero size cache. In one embodiment, a register of the CSRs 222 stores an indication specifying whether the computing system includes a zero size cache.

When the indication stored in the CSRs 222 specifies that the computing system is using a zero size cache, the cache controller 200 services memory requests while preventing accessing the zero size cache. Therefore, the miss queues 234 and the interface logic 240 are not used in such an implementation. However, in other computing systems, the computing system is not using a zero size cache, and miss queues 234 and the interface logic 240 are used as the cache controller 200 accesses the non-zero size cache. When the indication stored in the CSRs 222 specifies that the computing system is using a zero size cache, the functionality of the control logic 220 is equivalent to the functionality of the cache controller 140 (of FIG. 1). Additionally, in various embodiments, each of the cache controller 140 (of FIG. 1) and the control logic 220 are able to perform the steps described for the upcoming methods 300-900 (of FIGS. 3-9). The functionality of the control logic 220 is implemented in hardware, such as circuitry, in software and in a combination of hardware and software.

Figure 3:
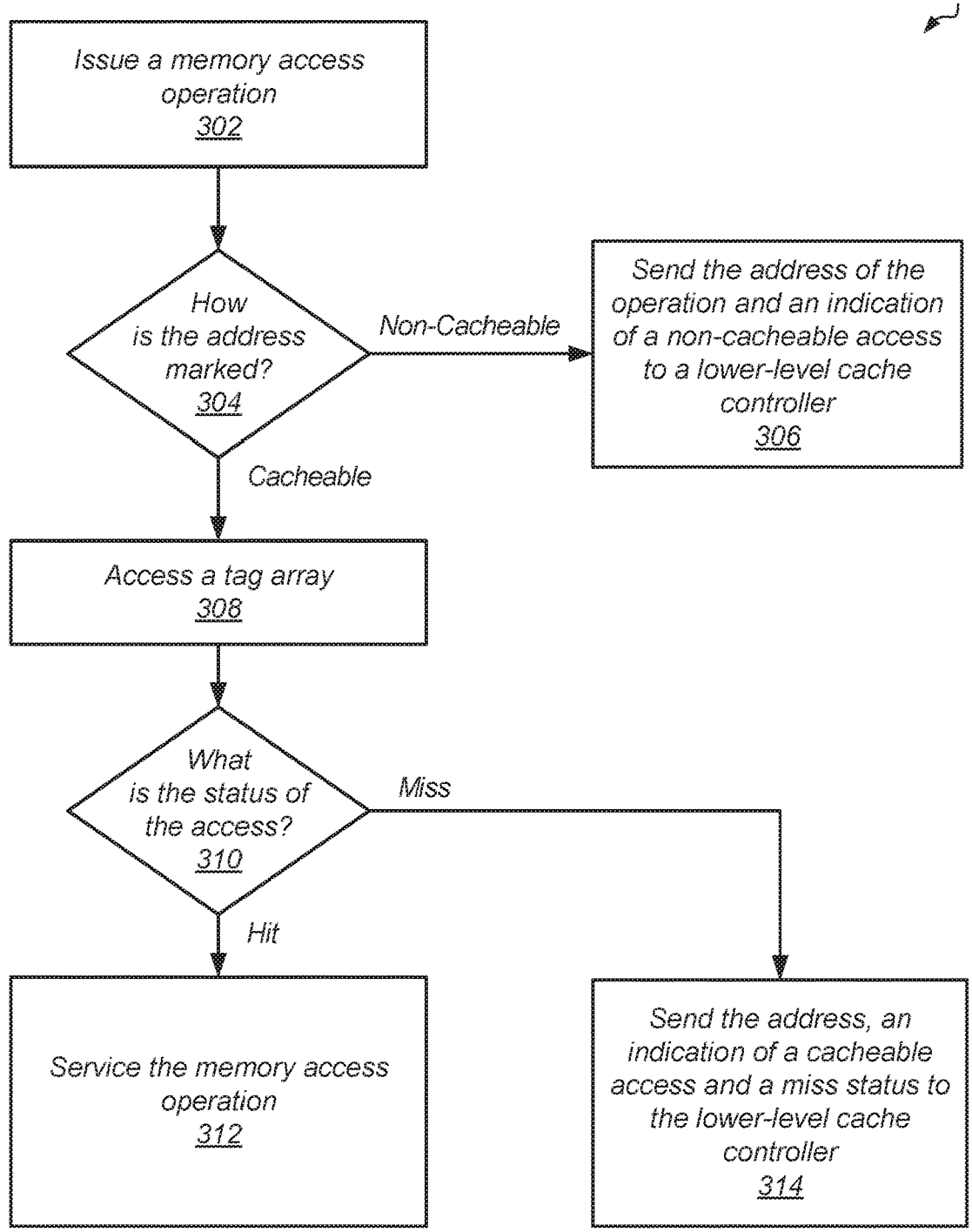
FIG. 3 is a flow diagram of one embodiment of a method for efficiently supporting a cache memory hierarchy potentially using a zero size cache in a level of the hierarchy.

Turning now to FIG. 3, a generalized flow diagram of one embodiment of a method 300 for efficiently supporting a cache memory hierarchy potentially using a zero size cache in a level of the hierarchy is shown. For purposes of discussion, the steps in this embodiment (as well as for FIGS. 4-9) are shown in sequential order. However, in other embodiments some steps may occur in a different order than shown, some steps may be performed concurrently, some steps may be combined with other steps, and some steps may be absent. Logic within a processor, such as an issue unit, issues a memory access operation (block 302). As used herein, a "memory access operation" is also referred to as a "memory access request" or a "memory request." In some embodiments, a load/store unit (LSU) receives the issued memory access operation, and accesses a translation lookaside buffer (TLB) to retrieve a corresponding address mapping. For example, the memory access operation uses a virtual (linear) address, and the LSU accesses the TLB to obtain a corresponding physical address. In addition, the selected TLB entry provides attributes for the virtual address in addition to the physical address.

One of the attributes retrieved from the selected TLB entry includes an indication of whether the requested data is cacheable or non-cacheable. If the virtual address is marked as non-cacheable by the retrieved attributes ("non-cacheable" branch of the conditional block 304), then one of the LSU and an upper-level cache controller sends the physical address of the memory access operation and an indication of a non-cacheable access to a lower-level cache controller (block 306). Otherwise, if the virtual address is marked as cacheable by the retrieved attributes ("cacheable" branch of the conditional block 304), then one of the LSU sends the physical address of the memory access operation and an indication of a cacheable access to the upper-level cache controller, which accesses a tag array (block 308). In some embodiments, the upper-level cache controller is an L1 cache controller and the lower-level cache controller is an L2 cache controller. In other embodiments, another combination of levels within the cache hierarchical memory subsystem are used.

If logic of the upper-level cache controller finds a tag of the physical address in the tag array ("hit" branch of the conditional block 310), then the upper-level cache controller services the memory access operation (block 312). For example, the upper-level cache controller retrieves the requested data from the data array of the upper-level cache and returns the requested data to the LSU. If the logic does not find the tag of the physical address in the tag array ("miss" branch of the conditional block 310), then the upper-level cache controller sends the physical address, an indication of a cacheable access and a miss status to the lower-level cache controller (block 314).

Figure 4:
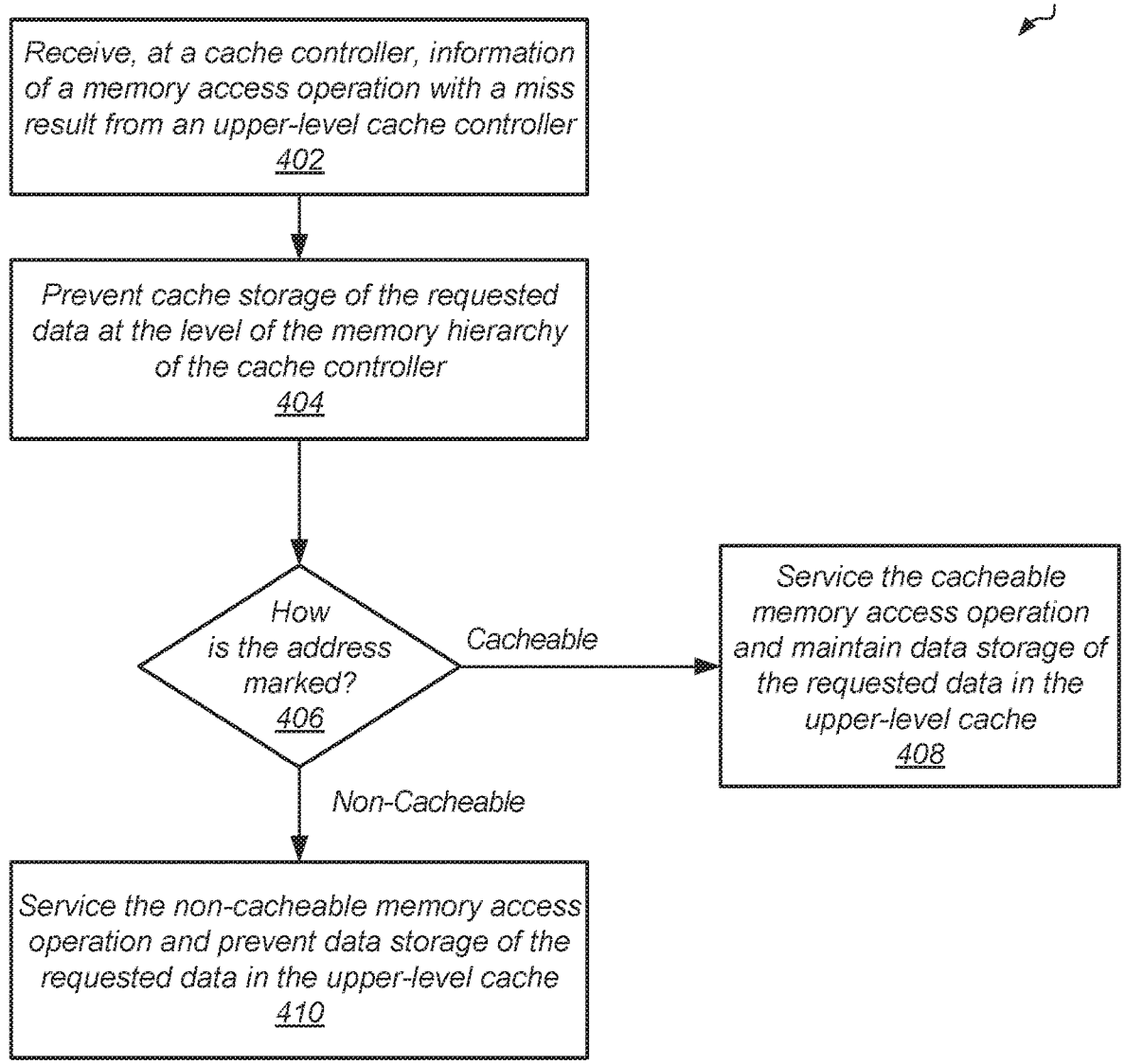
FIG. 4 is a flow diagram of one embodiment of a method for efficiently supporting a cache memory hierarchy potentially using a zero size cache in a level of the hierarchy.

Turning now to FIG. 4, a generalized flow diagram of one embodiment of a method 400 for efficiently supporting a cache memory hierarchy potentially using a zero size cache in a level of the hierarchy is shown. Logic in a lower-level cache controller receives information of a memory access operation with a miss result from an upper-level cache controller (block 402). In some embodiments, the lower-level cache controller is an L2 cache controller and the upper level cache controller is an L1 cache controller. In other embodiments, another combination of levels within the cache hierarchical memory subsystem are used. In various embodiments, the computing system does not include a cache memory corresponding to the cache controller. In one example, the cache controller is an L2 cache controller and the computing system does not include an L2 cache.

Logic in the lower-level cache controller prevents cache storage of the requested data at the level of the memory hierarchy of the lower-level cache controller (block 404). The logic inspects received attributes of the memory access operation. If the address is marked as cacheable ("cacheable" branch of the conditional block 406), then the logic services the cacheable memory access operation and maintains data storage of the requested data in the upper-level cache (block 408). For example, the logic forwards the memory access operation to lower-level memory such as an L3 cache controller or a memory controller for system memory. In this case, the lower-level memory does not include the zero size lower-level cache (zero size L2 cache). When the requested data is returned in a memory response, the logic forwards the requested data to the upper-level cache controller.

If the address is marked as non-cacheable ("non-cacheable" branch of the conditional block 406), then the logic services the non-cacheable memory access operation and prevents data storage of the requested data in the upper-level cache (block 410). In some embodiments, prior to sending the memory access operation to the lower-level memory for servicing, the logic sends a snoop request using the physical address of the received memory access operation to the upper-level cache controller. The logic sends the snoop request to determine whether the upper-level cache actually stores the requested data.

In various designs, while executing particular applications, a first virtual address uses a cacheable attribute for a given physical address, whereas, a second virtual address uses a non-cacheable attribute for the same given physical address. Therefore, it is possible for the L1 cache (or other upper-level cache) to store data for the first virtual address and for the TLB to store the first virtual address and the cacheable attribute although later, after a context switch and a page table walk, the TLB stores the second virtual address and the non-cacheable attribute indicating that the data cannot be stored in the L1 cache. The logic in the L2 cache controller (or other lower-level cache controller) is aware of this issue, and accordingly, sends a snoop request to the upper-level cache controller such as the L1 cache controller. Further details are provided in the method 600 (of FIG. 6).

In various designs, logic accesses the TLB with a linear address (virtual address) of a given memory access request to determine whether the TLB contains an associated physical address for a memory location holding requested data. If a mapping is not found within the TLB, then the address translation is performed by a lookup of the page table. This lookup process is referred to as a page table walk. The page table walk includes reading the contents of multiple memory locations and using them to compute the associated physical address. After the completed page table walk, the physical address is used to complete an associated memory access request. In addition, both the attributes (e.g., cacheable, non-cacheable) associated with the linear address and mapping of the linear address to the physical address are entered into the TLB. When a context switch occurs, a subset or all of the mappings of linear addresses to physical addresses are evicted from the TLB, and new mappings with their associated attributes (e.g., cacheable, non-cacheable) are entered into the TLB. Therefore, situations arise where the L1 data cache stores data pointed to by a linear address with a non-cacheable attribute. The logic in the L2 cache controller is aware of this potential case. Again, further details of this case and the logic in the L2 cache controller (lower-level cache controller) are provided in the method 600 (of FIG. 6).

Figure 5:
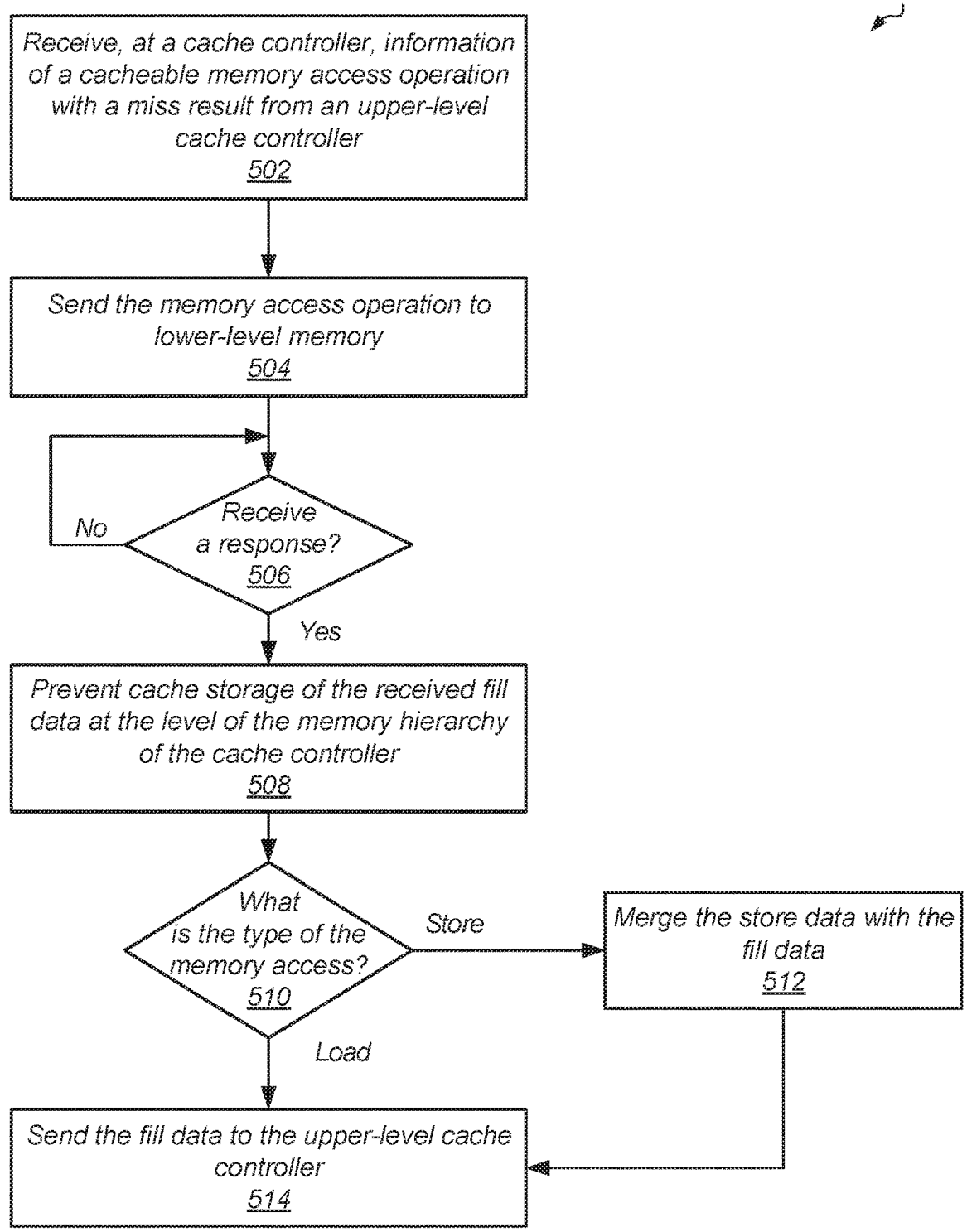
FIG. 5 is a flow diagram of one embodiment of a method for efficiently supporting a cache memory hierarchy potentially using a zero size cache in a level of the hierarchy.

Referring now to FIG. 5, a generalized flow diagram of one embodiment of a method 500 for efficiently supporting a cache memory hierarchy potentially using a zero size cache in a level of the hierarchy is shown. Although in the following description for methods 500-900 the lower-level cache controller is described as the L2 cache controller and the upper-level cache controller is described as the L1 cache controller, it is possible and contemplated that another combination of cache controllers in other levels of the cache memory hierarchy perform the steps described in the following description. The steps in the following description for methods 500-900 describe supporting the cache memory hierarchy that potentially uses a zero size cache in a level of the hierarchy. Logic in a L2 cache controller receives information of a cacheable memory access operation with a miss result from an upper-level cache controller (block 502). Logic in the L2 cache controller sends the memory access operation to lower-level memory (block 504). In one embodiment, the lower-level memory is an L3 cache or system memory.

If the L2 cache controller receives a response from the lower-level memory ("yes" branch of the conditional block 506), then the L2 cache controller prevents cache storage of the received fill data at the level of the cache memory hierarchy of the L2 cache controller (block 508). For example, there is no L2 cache present in the computing system, and logic in the L2 cache controller reads an indication from configuration and status registers (CSRs) specifying that there is no L2 cache present in the system. Therefore, the L2 cache controller does not attempt to store the received fill data in an L2 cache. If the cacheable memory access operation is a load operation ("load" branch of the conditional block 510), then logic in the L2 cache controller sends the fill data to the L1 cache controller (block 514). However, if the cacheable memory access operation is a store operation ("store" branch of the conditional block 510), then the logic in the L2 cache controller merges the store data with the fill data (block 512). Afterward, the logic in the L2 cache controller sends the fill data to the L1 cache controller (block 514).

Figure 6:
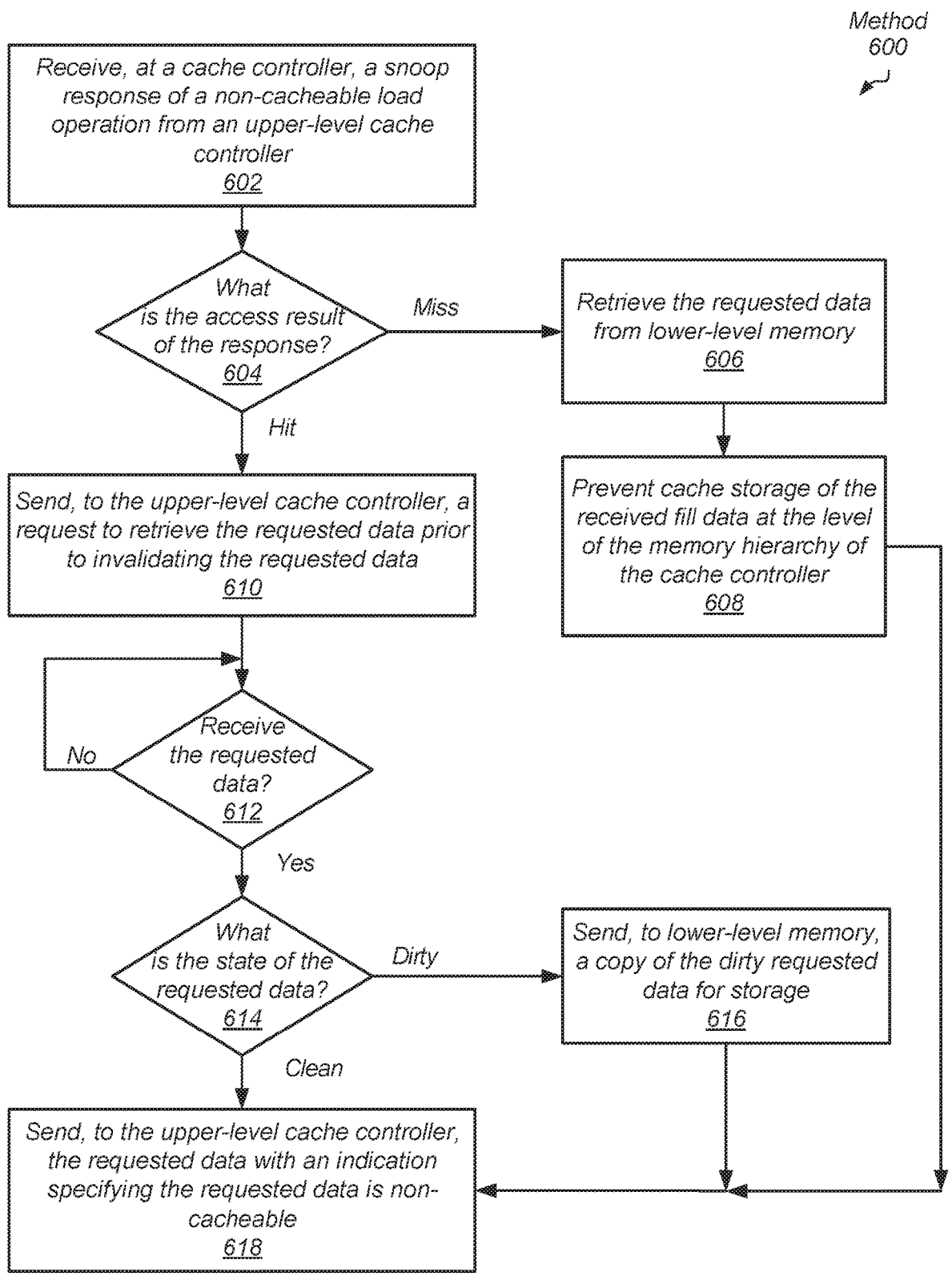
FIG. 6 is a flow diagram of one embodiment of a method for efficiently supporting a cache memory hierarchy potentially using a zero size cache in a level of the hierarchy.

Turning now to FIG. 6, a generalized flow diagram of one embodiment of a method 600 for efficiently supporting a cache memory hierarchy potentially using a zero size cache in a level of the hierarchy is shown. Logic in a L2 cache controller receives a snoop response of a non-cacheable load operation from a L1 cache controller (block 602). As described earlier regarding block 410 (of FIG. 4), there are cases where requested data is stored in the L1 cache despite the current non-cacheable attribute of its corresponding address. The logic in the L2 cache controller (or other lower-level cache controller) is aware of this issue, and accordingly, sent an earlier snoop request to the L1 cache controller.

If the snoop response indicates the requested data is not stored in the L1 cache ("miss" branch of the conditional block 604), then the logic of the L2 cache controller retrieves the requested data from lower-level memory (block 606) such as an L3 cache or system memory. The L2 cache controller prevents cache storage of the received fill data at the L2 cache, which is not present in the computing system (block 608). Afterward, the L2 cache controller sends, to the L1 cache controller, the requested data with an indication specifying the requested data is non-cacheable (block 618).

If the snoop response indicates the requested data is stored in the L1 cache ("hit" branch of the conditional block 604), then the logic of the L2 cache controller sends, to the L1 cache controller, a request to retrieve the requested data prior to invalidating the requested data (block 610). When the L2 cache controller receives the requested data ("yes" branch of the conditional block 612), and the requested data is modified ("dirty" branch of the conditional block 614), the L2 cache controller sends, to upper level memory, a copy of the dirty requested data for storage (block 616). Afterward, the L2 cache controller sends, to the upper-level cache controller, the requested data with an indication specifying the requested data is non-cacheable (block 618). Otherwise, when the L2 cache controller receives the requested data ("yes" branch of the conditional block 612), and the requested data is not modified ("clean" branch of the conditional block 614), the L2 cache controller sends, to the upper-level cache controller, the requested data with an indication specifying the requested data is non-cacheable (block 618).

Figure 7:
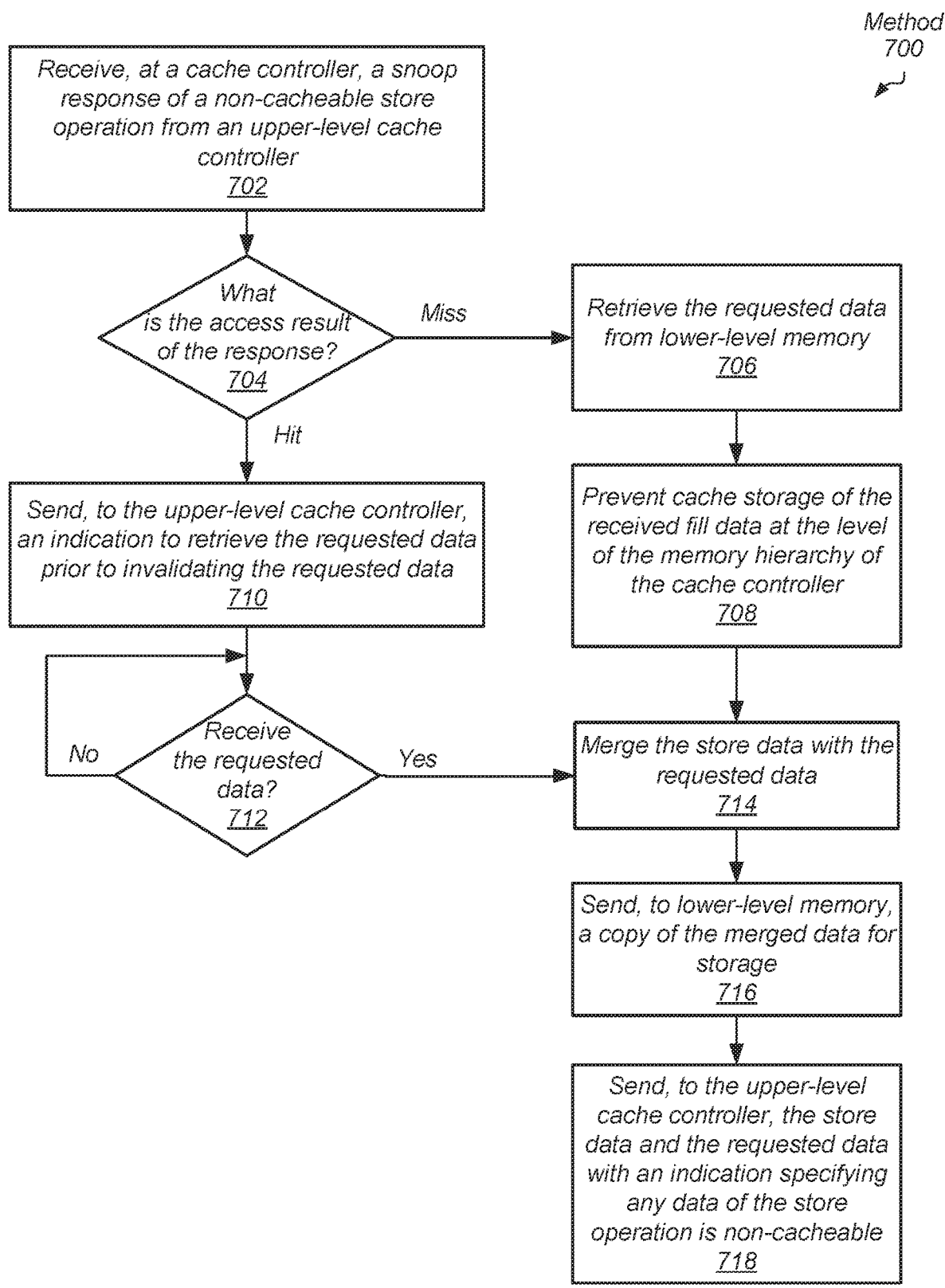
FIG. 7 is a flow diagram of one embodiment of a method for efficiently supporting a cache memory hierarchy potentially using a zero size cache in a level of the hierarchy.

Referring now to FIG. 7, a generalized flow diagram of one embodiment of a method 700 for efficiently supporting a cache memory hierarchy potentially using a zero size cache in a level of the hierarchy is shown. Logic in an L2 cache controller receives a snoop response of a non-cacheable store operation from an L1 cache controller (block 702). As described earlier regarding block 410 (of FIG. 4) and method 600 (of FIG. 6), there are cases where requested data is stored in the upper-level cache despite the current non-cacheable attribute of its corresponding address. The logic in the L2 cache controller (or other lower-level cache controller) is aware of this issue, and accordingly, sent an earlier snoop request to the upper-level cache controller such as the L1 cache controller.

If the snoop response indicates the requested data is not stored in the L1 cache ("miss" branch of the conditional block 704), then the logic of the L2 cache controller retrieves the requested data from lower level memory (block 706) such as an L3 cache or system memory. The L2 cache controller prevents cache storage of the received fill data at the L2 cache, which is not present in the computing system (block 708). If the snoop response indicates the requested data is stored in the L1 cache ("hit" branch of the conditional block 704), then the logic of the L2 cache controller sends, to the L1 cache controller, an indication to retrieve the requested data prior to invalidating the requested data (block 710). When the L2 cache controller receives the requested data ("yes" branch of the conditional block 712), control flow of method 700 moves to block 714 where the L2 cache controller merges the store data with the requested data.

When method 700 reaches block 714, the L2 cache controller has received the requested data either from the L1 cache (block 704 to 710 to 712) or from the lower-level memory such as an L3 cache or system memory (block 704 to 706 to 708). As described above, in block 714, the L2 cache controller merges the store data with the requested data. When the L2 cache controller performs this merging, the L2 cache controller overwrites a subset or all of the requested data with the store data based on the size of the store data. Following this, the L2 cache controller sends to the lower-level memory, such as a L3 cache or system memory, a copy of the merged data for storage (block 716).

Next, in an embodiment, the L2 cache controller sends, to the L1 cache controller, one or more of the store data, the requested data, and the merged data with an indication specifying any data of the store operation is non-cacheable (block 718). Therefore, the L1 cache controller is able to send an indication to other components of the processor, such a load-store unit, that the store operation is serviced without storing the non-cacheable merged data or the non-cacheable requested data in the L1 cache. In some designs, the L1 cache controller performs the merging of the store data and the requested data, and sends the resulting merged data to the L2 cache controller without being aware that there is no L2 cache. The L2 cache controller will later discard it. Due to the non-cacheable attribute, the L1 cache controller does not attempt to store the merged data in the L1 cache.

Figure 8:
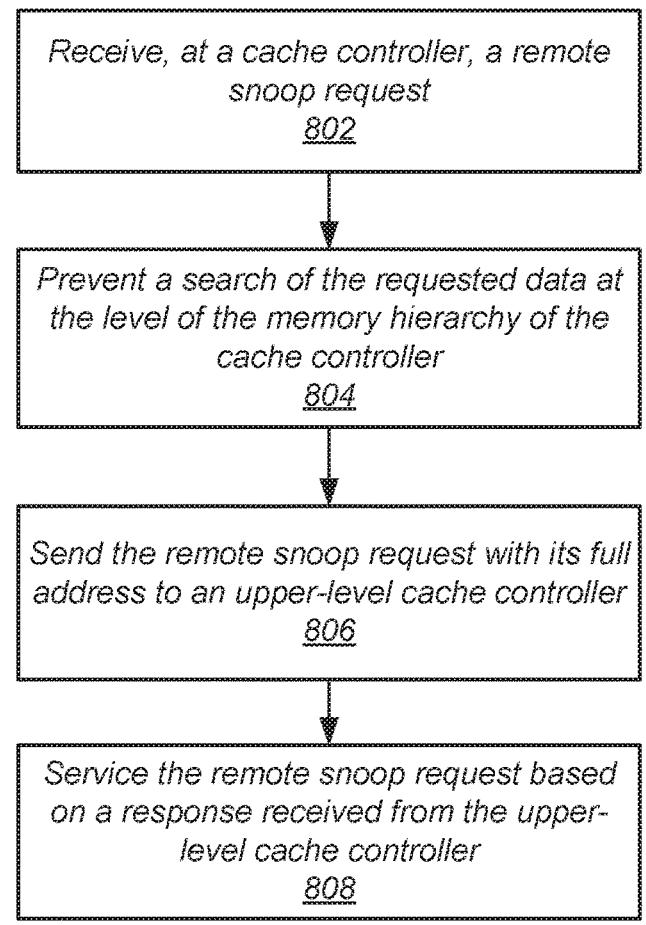
FIG. 8 is a flow diagram of one embodiment of a method for efficiently supporting a cache memory hierarchy potentially using a zero size cache in a level of the hierarchy.

Turning now to FIG. 8, a generalized flow diagram of one embodiment of a method 800 for efficiently supporting a cache memory hierarchy potentially using a zero size cache in a level of the hierarchy is shown. Logic in a L2 cache controller receives a remote (external) snoop request (block 802). The L2 cache controller prevents a search of the requested data at the L2 cache, which may not be present in the computing system (block 804). The L2 cache controller sends the remote snoop request with its full address to the L1 cache controller (block 806). Therefore, the L2 cache controller does not filter remote requests from the L1 cache controller. The L2 cache controller services the remote snoop request based on a response received from the L1 cache controller (block 808). For example, the L2 cache controller sends a response to the source of the snoop request with an indication of a hit/miss result received from the L1 cache controller.

Figure 9:
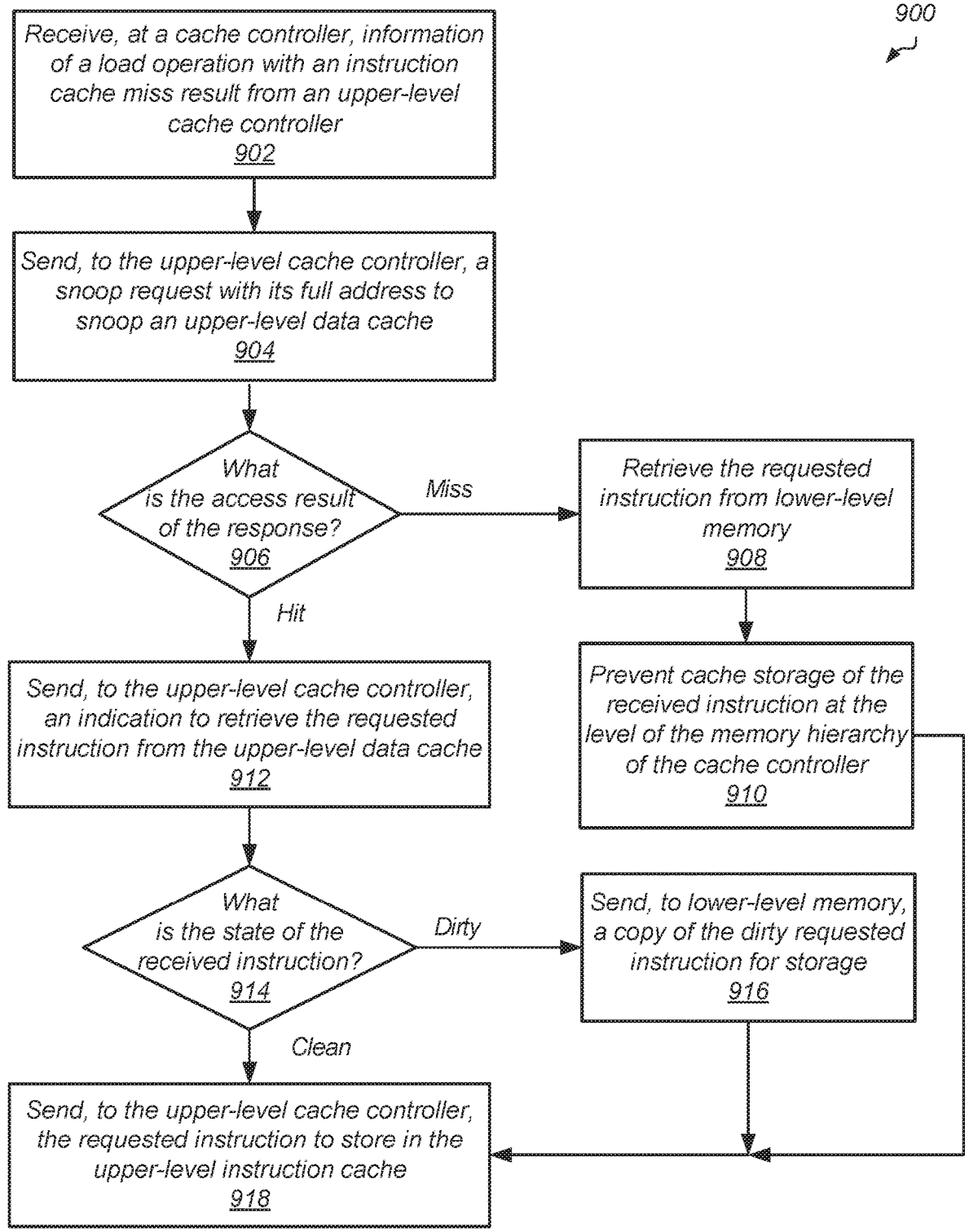
FIG. 9 is a flow diagram of one embodiment of a method for efficiently supporting a cache memory hierarchy potentially using a zero size cache in a level of the hierarchy.

Referring now to FIG. 9, a generalized flow diagram of one embodiment of a method 900 for efficiently supporting a cache memory hierarchy potentially using a zero size cache in a level of the hierarchy is shown. Logic in an L2 cache controller receives information of a load operation with an instruction cache miss result from an L1 cache controller (block 902). The L2 cache controller sends, to the L1 cache controller, a snoop request with its full address to snoop the L1 data cache (block 904).

In one example, the processor is executing self-modifying code, which updates the instructions read from the L1 instruction cache. Typically, processors store data in the L1 instruction cache when performing instruction fetches, and store in the L1 data cache results generated by components in the pipeline stages such as the execution pipeline stages. In several designs, when logic in the processor detects a store operation targeting a memory location pointed to by a linear address of an instruction in a code segment and the contents (i.e., an instruction) of the memory location are currently stored in the L1 instruction cache, the logic invalidates the copy of the contents in the L1 instruction cache. The updated instruction pointed to by the same linear address is stored in the L1 data cache. This logic performs steps to ensure that the stored contents of the L1 instruction cache are consistent with one or more of the L1 data cache and system memory. However, in some cases, the instruction is fetched using the linear address before the modified instruction is stored in the L1 instruction cache. The fetch results in an L1 instruction cache miss, since the processor cannot find the instruction in the L1 instruction cache. Similar to the problem described earlier with cacheable and non-cacheable attributes associated with address mappings stored in the TLB and the logic in the L2 cache controller being aware of the problem, the logic in the L2 cache controller is also aware of the self-modifying code issue. Accordingly, the L2 cache controller snoops the L1 data cache.

If the snoop response indicates the requested instruction is not stored in the L1 data cache ("miss" branch of the conditional block 906), then the logic of the L2 cache controller retrieves the requested data from lower-level memory (block 908) such as system memory. The L2 cache controller prevents cache storage of the received fill data at the L2 cache, which is not present in the computing system (block 910). Afterward, the L2 cache controller sends, to the L1 cache controller, the requested instruction to store in the L1 instruction cache (block 918).

If the snoop response indicates the requested instruction is stored in the L1 data cache ("hit" branch of the conditional block 906), then the logic of the L2 cache controller sends, to the L1 cache controller, an indication to retrieve the requested instruction from the L1 data cache (block 912). If the requested instruction is modified ("dirty" branch of the conditional block 914), then the L2 cache controller sends, to lower-level memory, a copy of the modified requested instruction for storage (block 916). More than likely, the instruction is modified, which is why the instruction is stored in the L1 data cache. Afterward, the L2 cache controller sends, to the L1 cache controller, the requested instruction to store in the L1 instruction cache (block 918). However, if the requested instruction is unmodified ("clean" branch of the conditional block 914), then the L2 cache controller sends, to the L1 cache controller, the requested instruction to store in the L1 instruction cache (block 918).

Figure 10:
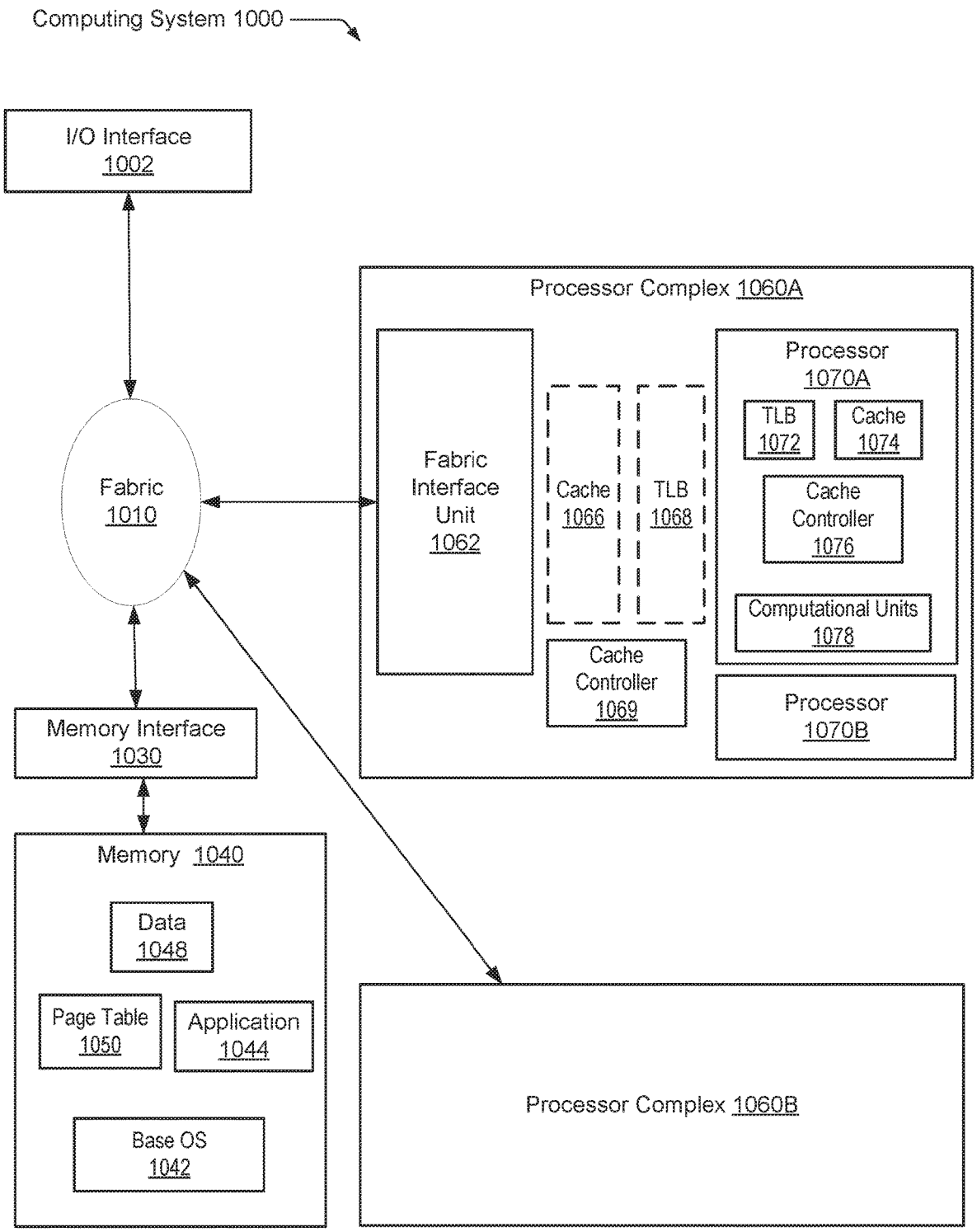
FIG. 10 is a block diagram of one embodiment of a computing system.

Referring to FIG. 10, a generalized block diagram of one embodiment of a computing system 1000 is shown. As shown, a communication fabric 1010 routes traffic between the input/output (I/O) interface 1002, the memory interface 1030, and the processor complexes 1060A-1060B. In various embodiments, the computing system 1000 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, power managers, and so forth are not shown in FIG. 2 for ease of illustration. It is also noted that the number of components of the computing system 1000 (and the number of subcomponents for those shown in FIG. 10, such as within each of the processor complexes 1060A-1060B) vary from embodiment to embodiment. The term "processor complex" is used to denote a configuration of one or more processor cores using local storage, such as a shared cache memory subsystem, and capable of processing a workload together.

In various embodiments, different types of traffic flows independently through the fabric 1010. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 1010 may also be packet-based, and may be hierarchical with bridges, cross bar, point-to-point, or other interconnects.

In some embodiments, the memory interface 1030 uses at least one memory controller and at least one cache for the off-chip memory, such as synchronous DRAM (SDRAM). The memory interface 1030 stores memory requests in request queues, uses any number of memory ports, and uses circuitry capable of interfacing to memory 1040 using one or more of a variety of protocols used to interface with memory channels used to interface to memory devices (not shown). In various embodiments, one or more of the memory interface 1030, an interrupt controller (not shown), and the fabric 1010 uses control logic to ensure coherence among the different processor complexes 1060A-1060B and peripheral devices.

As shown, memory 1040 stores application 1044. In an example, a copy of at least a portion of application 1044 is loaded into an instruction cache in one of the processors 1070A-1070B when application 1044 is selected by the base operating system (OS) 1042 for execution. Alternatively, a virtual (guest) OS (not shown) selects application 1044 for execution. Memory 1040 stores a copy of the base OS 1042 and copies of portions of base OS 1042 are executed by one or more of the processors 1070A-1070B. Data 1048 represents source data for applications in addition to result data and intermediate data generated during the execution of applications.

A virtual address space for the data stored in memory 1040 and used by a software process is typically divided into pages of a prefixed size. The virtual pages are mapped to frames of physical memory. The mappings of virtual addresses to physical addresses where virtual pages are loaded in the physical memory are stored in page table 1050. Each of translation look-aside buffers (TLBs) 1068 and 1072 stores a subset of page table 1050.

In some embodiments, the components 1062-1078 of the processor complex 1060A are similar to the components in the processor complex 1060B. In other embodiments, the components in the processor complex 1060B are designed for lower power consumption, and therefore, include control logic and processing capability producing less performance. For example, supported clock frequencies may be less than supported clock frequencies in the processor complex 1060A. In addition, one or more of the processors in processor complex 1060B may include a smaller number of execution pipelines and/or functional blocks for processing relatively high power consuming instructions than what is supported by the processors 1070A-1070B in the processor complex 1060A.

As shown, processor complex 1060A uses a fabric interface unit (FIU) 1062 for providing memory access requests and responses to at least the processors 1070A-1070B. Processor complex 1060A also supports a cache memory subsystem, which includes at least cache 1066. In some embodiments, the cache 1066 is a shared off-die level two (L2) cache for the processors 1070A-1070B although an L3 cache is also possible and contemplated. In various embodiments, the processor complex 1060A does not actually include the off-die cache 1066 and the cache controller 1069 still supports servicing memory requests from the cache controller 1076. In various embodiments, the functionality of the cache controller 1069 is equivalent to the functionality of the cache controller 140 (of FIG. 1) and the cache controller 200 (of FIG. 2).

In some embodiments, the processors 1070A-1070B use a homogeneous architecture. For example, each of the processors 1070A-1070B is a general-purpose processor, such as a central processing unit (CPU), which utilizes circuitry for executing instructions according to a predefined general-purpose instruction set. Any of a variety of instruction set architectures (ISAs) is selected. In some embodiments, each core within processors 1070A-1070B supports the out-of-order execution of one or more threads of a software process and include a multi-stage pipeline. In other embodiments, one or more of the processors 1070A-1070B supports in-order execution of instructions. The processors 1070A-1070B may support the execution of a variety of operating systems.

In other embodiments, the processors 1070A-1070B use a heterogeneous architecture. In such embodiments, one or more of the processors 1070A-1070B is a highly parallel data architected processor, rather than a CPU. In some embodiments, these other processors of the processors 1070A-1070B use single instruction multiple data (SIMD) cores. Examples of SIMD cores are graphics processing units (GPUs), digital signal processing (DSP) cores, or otherwise.

In various embodiments, each one of the processors 1070A-1070B uses one or more cores and one or more levels of a cache memory subsystem. The processors 1070A-1070B use multiple one or more on-die levels (L1, L2, L3 and so forth) of caches for accessing data and instructions. If a requested block is not found in the on-die caches or in the off-die cache 1066, then a read request for the missing block is generated and transmitted to the cache controller 1069. The cache controller 1069 is capable of transmitted memory requests to the memory 1040 via the memory interface 1030 and fabric 1010. When application 1044 is selected for execution by processor complex 1060A, a copy of the selected application is retrieved from memory 1040 and stored in cache 1074. In various embodiments, each of processor complexes 1060A-1060B utilizes linear addresses (virtual addresses) when retrieving instructions and data from caches 1074 and 1066 while processing applications.

Figure 11:
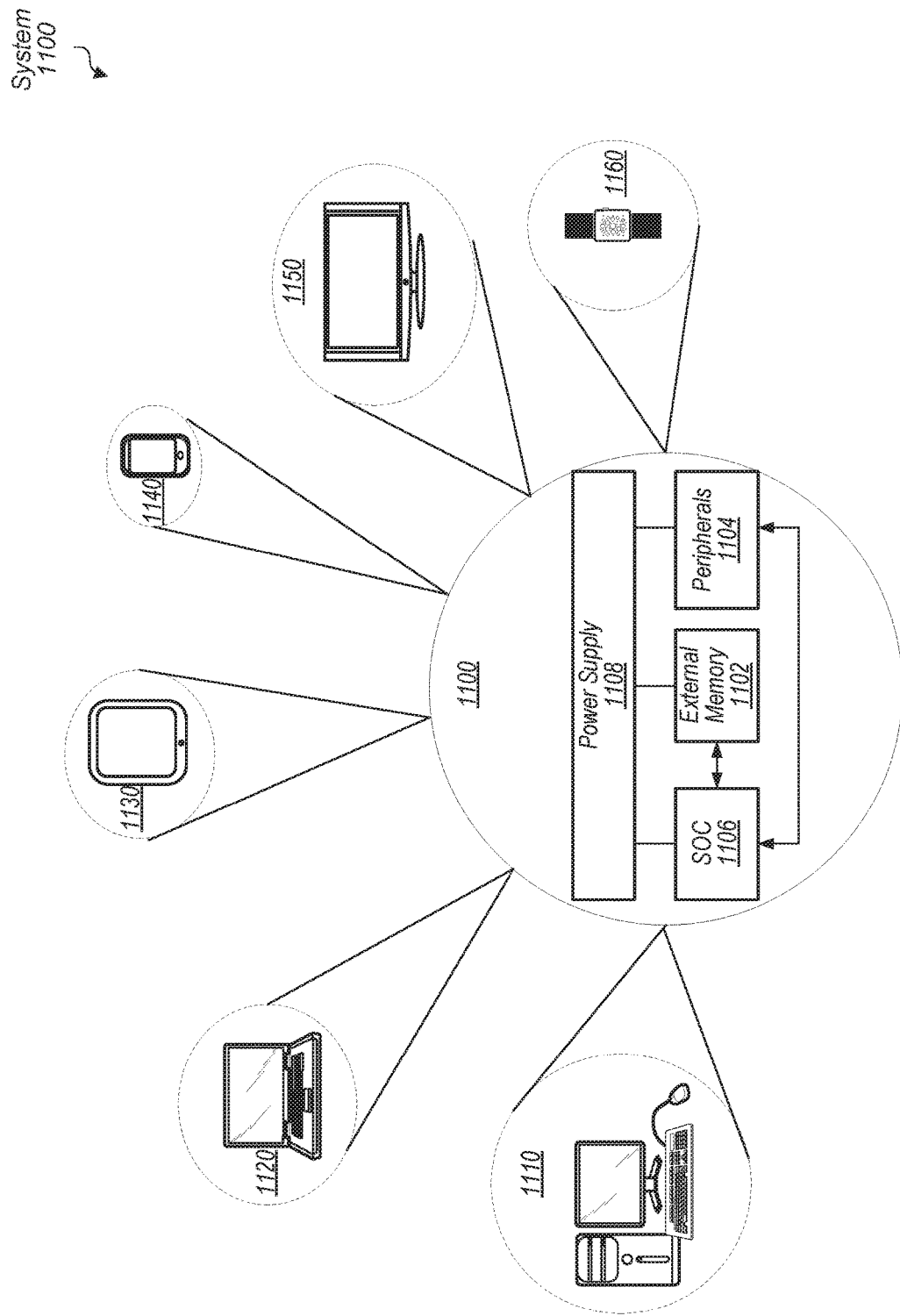
FIG. 11 is a block diagram of one embodiment of a system.

Turning next to FIG. 11, a block diagram of one embodiment of a system 1100 is shown. As shown, system 1100 represents chip, circuitry, components, etc., of a desktop computer 1110, laptop computer 1120, tablet computer 1130, cell or mobile phone 1140, television 1150 (or set top box coupled to a television), wrist watch or other wearable item 1160, or otherwise. Other devices are possible and are contemplated. In the illustrated embodiment, the system 1100 includes at least one instance of a system on chip (SoC) 1106 which includes multiple processors and a communication fabric. In some embodiments, SoC 1106 includes components similar to cache controller 140 (of FIG. 1), cache controller 200 (of FIG. 2) and cache controller 1069 (of FIG. 10) for supporting memory accesses whether or not a cache memory corresponding to the named cache controllers is actually present in the system. In various embodiments, SoC 1106 is coupled to external memory 1102, peripherals 1104, and power supply 1108.

A power supply 1108 is also provided which supplies the supply voltages to SoC 1106 as well as one or more supply voltages to the memory 1102 and/or the peripherals 1104. In various embodiments, power supply 1108 represents a battery (e.g., a rechargeable battery in a smart phone, laptop or tablet computer). In some embodiments, more than one instance of SoC 1106 is included (and more than one external memory 1102 is included as well).

The memory 1102 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1104 include any desired circuitry, depending on the type of system 1100. For example, in one embodiment, peripherals 1104 includes devices for various types of wireless communication, such as Wi-Fi, Bluetooth, cellular, global positioning system, etc. In some embodiments, the peripherals 1104 also include additional storage, including RAM storage, solid-state storage, or disk storage. The peripherals 1104 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a first interface configured to communicate with a lower level of a memory hierarchy;
a second interface configured to communicate with a cache of a higher level of the memory hierarchy; and
circuitry configured to send a snoop request to the cache of the higher level of the memory hierarchy for requested data, based at least in part on receipt of an indication that the cache of the higher level of the memory hierarchy does not store the requested data.

2. The apparatus as recited in claim 1, wherein the circuitry is further configured to send a request to the lower level of the memory hierarchy based at least in part on receipt of a snoop response from the cache of the higher level of the memory hierarchy indicating that the cache of the higher level of the memory hierarchy does not store the requested data.

3. The apparatus as recited in claim 1, wherein the circuitry is further configured to send a request to the lower level of the memory hierarchy based at least in part on a determination that the requested data is cacheable.

4. The apparatus as recited in claim 3, the circuitry is further configured to:
receive, from the lower level of the memory hierarchy, fill data corresponding to the request sent to the lower level of the memory hierarchy; and
prevent storage of the fill data in a cache at a same level of a cache memory hierarchy as the apparatus.

5. The apparatus as recited in claim 1, wherein the circuitry is further configured to send, to the cache of the higher level of the memory hierarchy, a request to retrieve the requested data prior to invalidating the requested data, based at least in part on receipt of a snoop response from the cache of the higher level of the memory hierarchy that indicates the cache of the higher level of the memory hierarchy does store the requested data.

6. The apparatus as recited in claim 5, wherein the circuitry is further configured to send, to the cache of the higher level of the memory hierarchy, the requested data with an indication specifying the requested data is non-cacheable based at least in part on:
receipt of the requested data from the cache of the higher level of the memory hierarchy; and
a determination that the cache of the higher level of the memory hierarchy previously received a load operation targeting the requested data.

7. The apparatus as recited in claim 5, wherein the circuitry is further configured to send, to the lower level of the memory hierarchy, the requested data with an indication specifying the requested data is modified, based at least in part on:
receipt of the requested data from the cache of the higher level of the memory hierarchy with an indication that the requested data is modified; and
a determination that the cache of the higher level of the memory hierarchy previously received a load operation targeting the requested data.

8. The apparatus as recited in claim 5, wherein the circuitry is further configured to merge store data with the requested data based at least in part on:
receipt of the requested data from the cache of the higher level of the memory hierarchy; and
a determination that the cache of the higher level of the memory hierarchy previously received a store operation comprising the store data.

9. The apparatus as recited in claim 8, wherein the circuitry is further configured to:
send, to the cache of the higher level of the memory hierarchy, the merged data with an indication specifying the merged data is non-cacheable; and
send, to the lower level of the memory hierarchy, a copy of the merged data for storage based at least in part on the requested data is modified.

10. A method, comprising:
communicating, via a cache controller, with a lower level of a memory hierarchy;
communicating, via the cache controller, with a cache of a higher level of the memory hierarchy; and
sending a snoop request to the cache of the higher level of the memory hierarchy for requested data, responsive to receiving an indication that the cache of the higher level of the memory hierarchy does not store the requested data.

11. The method as recited in claim 10, further comprising sending a request to the lower level of the memory hierarchy, in response to determining the requested data is cacheable.

12. The method as recited in claim 10, further comprising:
receiving, from the lower level of the memory hierarchy, fill data corresponding to the request sent to the lower level of the memory hierarchy; and
preventing storage of the fill data in a cache at a same level of a cache memory hierarchy as the apparatus.

13. The method as recited in claim 10, further comprising sending a request to the lower level of the memory hierarchy, in response to receiving a snoop response from the cache of the higher level of the memory hierarchy indicating that the higher level cache does not store the requested data.

14. The method as recited in claim 10, further comprising sending, to the cache of the higher level of the memory hierarchy, a request to retrieve the requested data prior to invalidating the requested data, in response to receiving a snoop response from the cache of the higher level of the memory hierarchy indicating that the cache of the higher level of the memory hierarchy does store the requested data.

15. The method as recited in claim 14, further comprising sending, to the cache of the higher level of the memory hierarchy, the requested data with an indication specifying the requested data is non-cacheable, responsive to:
receiving the requested data from the cache of the higher level of the memory hierarchy; and
determining the cache of the higher level of the memory hierarchy previously received a load operation targeting the requested data.

16. The method as recited in claim 14, further comprising sending, to the lower level of the memory hierarchy, the requested data with an indication specifying the requested data is modified, responsive to:
receiving the requested data from the cache of the higher level of the memory hierarchy with an indication that the requested data is modified; and
determining the cache of the higher level of the memory hierarchy previously received a load operation targeting the requested data.

17. A system comprising:
a cache controller;
a lower level of a memory hierarchy than the cache controller;
a cache of a higher level of the memory hierarchy than the cache controller; and
wherein the cache controller is configured to:
communicate with the lower level of the memory hierarchy;
communicate with the cache of the higher level of the memory hierarchy; and
send a snoop request to the cache of the higher level of the memory hierarchy for requested data based at least in part on receipt of an indication that the cache of the higher level of the memory hierarchy does not store the requested data.

18. The system as recited in claim 17, wherein the lower-level cache controller is further configured to send a request to the lower level of the memory hierarchy based at least in part on a determination that the requested data is cacheable.

19. The system as recited in claim 17, wherein the lower-level cache is further configured to:
receive, from the lower level of the memory hierarchy, fill data corresponding to the request sent to the lower level of the memory hierarchy; and
prevent storage of the fill data in a cache at a same level of a cache memory hierarchy as the apparatus.

20. The system as recited in claim 17, wherein the lower-level cache controller is further configured to send a request to the lower level of the memory hierarchy based at least in part on receipt of a snoop response from the cache of the higher level of the memory hierarchy indicating that the cache of the higher level of the memory hierarchy does not store the requested data.

* * * * *